United States Patent
Young et al.

(10) Patent No.: US 12,484,568 B1
(45) Date of Patent: Dec. 2, 2025

(54) DEVICE FOR ATTRACTING WORMS TO THE SURFACE OF THE SOIL

(71) Applicant: Forever Young Industries, Brookfield, CT (US)

(72) Inventors: Hunter Young, Brookfield, CT (US); Wayne Young, Brewster, NY (US)

(73) Assignee: Forever Young Industries, Brookfield, CT (US)

( * ) Notice: Subject to any disclaimer, the term of this patent is extended or adjusted under 35 U.S.C. 154(b) by 0 days.

(21) Appl. No.: 19/217,046

(22) Filed: May 23, 2025

Related U.S. Application Data

(60) Provisional application No. 63/655,112, filed on Jun. 3, 2024.

(51) Int. Cl.
*A01M 1/02* (2006.01)

(52) U.S. Cl.
CPC ......... *A01M 1/02* (2013.01); *A01M 2200/011* (2013.01)

(58) Field of Classification Search
CPC .................................................. A01M 1/023
See application file for complete search history.

(56) References Cited

U.S. PATENT DOCUMENTS

| | | | | |
|---|---|---|---|---|
| 417,838 A | * | 12/1889 | Richards | A01G 9/12 D8/1 |
| 518,930 A | * | 4/1894 | Allen | A63B 67/06 273/386 |
| 839,822 A | * | 1/1907 | Dunnington | E02D 5/801 52/157 |
| 904,769 A | * | 11/1908 | Ford | A01G 9/12 47/47 |
| 2,642,699 A | * | 6/1953 | Green | G10K 3/00 43/2 |
| 3,073,284 A | * | 1/1963 | Roberts | A01K 67/00 47/1.3 |
| 3,178,849 A | * | 4/1965 | Pradon | A01M 23/245 43/96 |
| 4,187,635 A | * | 2/1980 | Deissler | G08B 3/02 181/138 |
| 4,420,918 A | * | 12/1983 | Arnoux | H01R 4/66 52/157 |
| 4,488,470 A | * | 12/1984 | Larrain | G10D 13/12 984/150 |
| 4,673,372 A | * | 6/1987 | Hall | A63H 33/002 446/239 |

(Continued)

OTHER PUBLICATIONS

"Frisco(R) Easy Grip Stake" Chewy.com <https://www.chewy.com/frisco-easy-grip-stake-tie-out-cable/dp/193148> Oct. 22, 2019 (Year: 2019).*

*Primary Examiner* — Morgan T Jordan
(74) *Attorney, Agent, or Firm* — Neil D. Gershon

(57) ABSTRACT

A vibrational system for attracting worms having a ground insertion end at a distal portion, a grasping end at a proximal portion, and a plurality of coils at an intermediate portion between the distal portion and the proximal portion spaced apart to provide axially spaced apart gaps between the plurality of coils. The plurality of coils are configured to emit a vibration that attracts worms upon strumming of the coils. A strummer can be provided as a separate component unattached to the vibrational device to engage the coils.

20 Claims, 5 Drawing Sheets

(56) References Cited

U.S. PATENT DOCUMENTS

| | | | | |
|---|---|---|---|---|
| 4,860,489 | A | * | 8/1989 | Bork .................. A01G 9/12 47/45 |
| 5,019,008 | A | * | 5/1991 | Hughes ............... A01M 31/004 446/207 |
| 5,526,774 | A | * | 6/1996 | Swindall, Jr. ............ A01K 1/04 119/787 |
| 6,069,308 | A | * | 5/2000 | Rabb ...................... G10D 13/06 84/422.4 |
| 6,698,132 | B1 | * | 3/2004 | Brint .................... A01M 31/06 43/2 |
| 6,922,943 | B1 | * | 8/2005 | Paille ...................... A01G 9/12 47/47 |
| 9,131,670 | B2 | * | 9/2015 | Johnston ................ A01K 67/33 |
| 2006/0042156 | A1 | * | 3/2006 | Holland ............... A01M 29/24 43/132.1 |
| 2012/0217709 | A1 | * | 8/2012 | Christofilis ............... B25F 3/00 279/145 |
| 2013/0269616 | A1 | * | 10/2013 | Johnston ................ A01K 97/04 119/6.7 |
| 2016/0088830 | A1 | * | 3/2016 | Burcham ............ A01M 31/004 446/418 |
| 2016/0353676 | A1 | * | 12/2016 | Valum .................... A01G 9/12 |
| 2017/0051523 | A1 | * | 2/2017 | Brooks ............... E04H 12/2269 |
| 2017/0258071 | A1 | * | 9/2017 | Jacobsen ............ A01M 31/004 |
| 2024/0172736 | A1 | * | 5/2024 | Moser .................. A01M 1/023 |

* cited by examiner

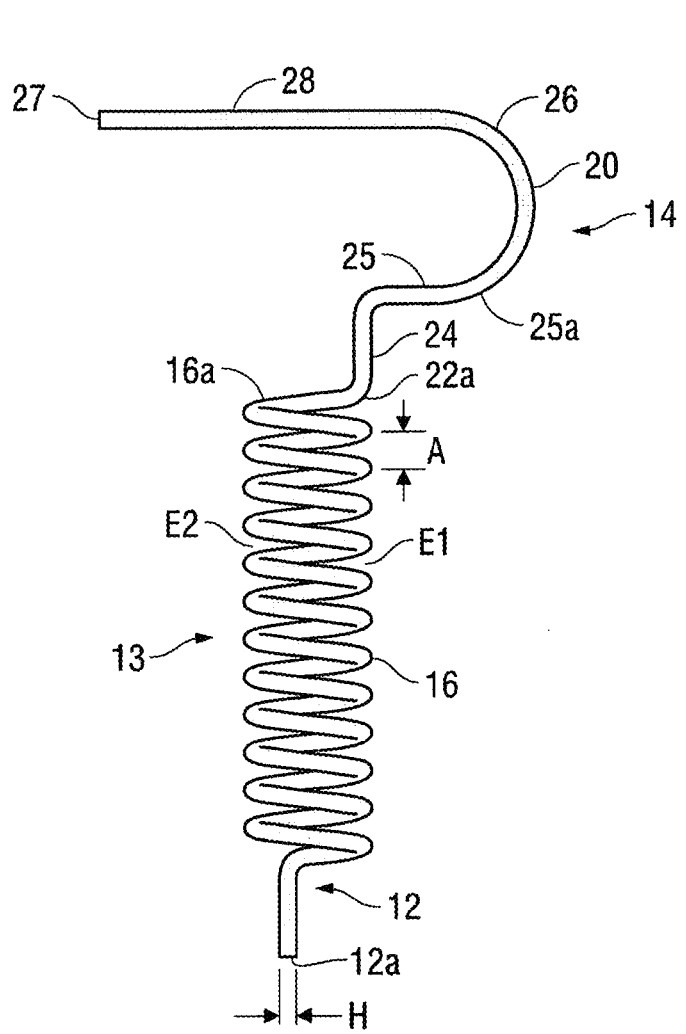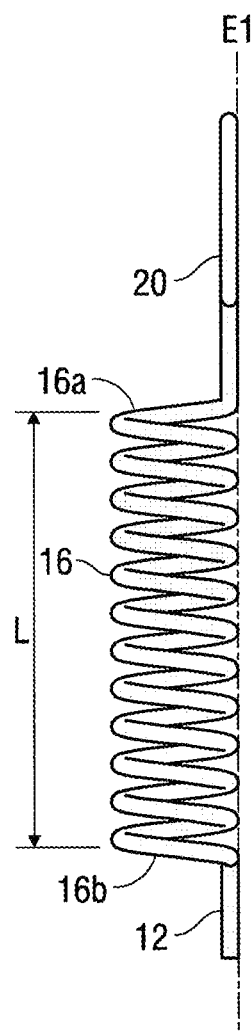
FIG. 2A　　　FIG. 2B
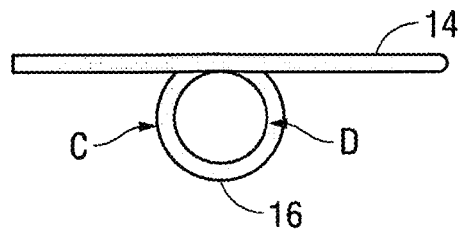
FIG. 3

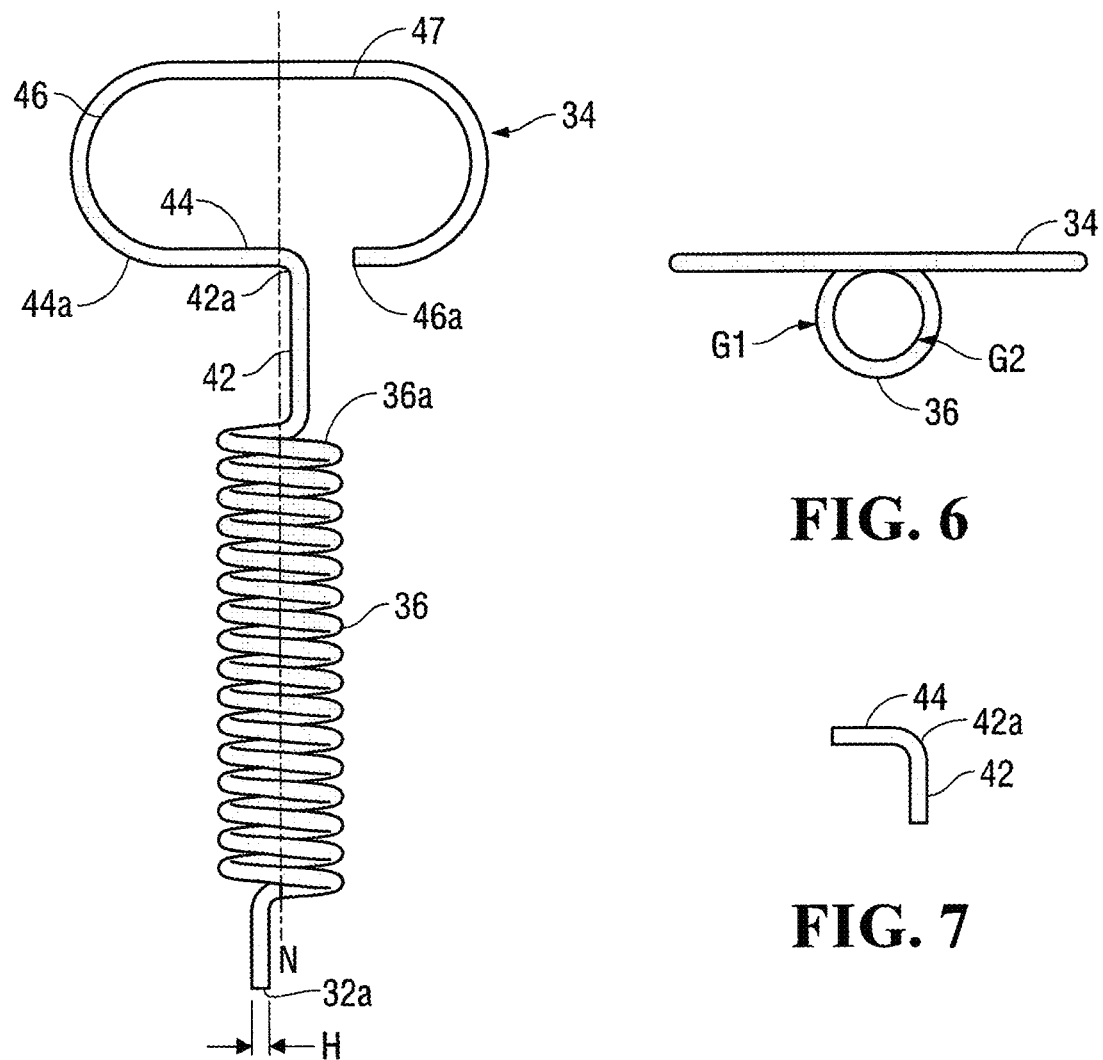
FIG. 5
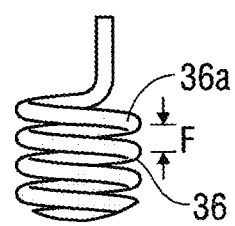
FIG. 6
FIG. 7
FIG. 8

DEVICE FOR ATTRACTING WORMS TO THE SURFACE OF THE SOIL

BACKGROUND OF THE INVENTION

This application claims priority to provisional application 63/655,112, filed Jun. 3, 2024, the entire contents of which are incorporated herein by reference.

FIELD OF THE INVENTION

The present invention is directed to a device for attracting worms to the surface of the soil, and, more particularly, to a vibration device insertable into the soil to drive worms to the surface.

BACKGROUND

It is known that vibration drives worms out of the ground to the surface. There have been several attempts to create vibration to attract worms. For example, rubbing two sticks together, one or both of which have notches, have been attempted as an attraction device. Electrifying rods in the ground has also been used. However, these devices suffer from various deficiencies.

It would be advantageous to provide an inexpensive, easy to use and more effective device and method for attracting worms.

SUMMARY OF THE INVENTION

The present invention overcomes the problems and deficiencies of the prior art. The present invention provides a vibration method and system comprising a coiled device insertable into the ground and a strummer to interact with the coils to create the desired vibration. The coils are advantageously configured to accommodate the strummer and maximize the use of vibration to the most effective frequency. Details of the device, and alternative designs, are discussed in detail below.

In accordance with one aspect of the present invention, a vibrational system for attracting worms is provided comprising a ground insertion end at a distal portion, a grasping end at a proximal portion and a plurality of coils at an intermediate portion between the distal portion and the proximal portion, the plurality of coils configured to emit a vibration upon strumming of the coils.

In some embodiments, the system further comprises a strummer for strumming the coils. In some embodiments, a space between adjacent coils of the plurality of coils is less than an outer diameter of the strummer to thereby prevent the strummer from getting stuck between adjacent coils. In some embodiments, the strummer includes an elongated metal rod.

In some embodiments, the ground insertion end extends distally from a lowermost coil and is substantially parallel to a longitudinal axis of the intermediate portion. In some embodiments, the insertion end is aligned with a central longitudinal axis of the intermediate section; in other embodiments, the insertion end is offset from a central longitudinal axis on the intermediate section. In some embodiments, the grasping end includes a handle having a component extending parallel to a longitudinal axis of the intermediate portion and aligned with the insertion end.

In some embodiments, wherein the insertion end has a blunt tip; in other embodiments, the insertion end has a pointed tip.

In some embodiments, the vibration device is self-standing when the insertion end is inserted into a ground.

In some embodiments, the grasping end includes a handle having a longitudinally extending component substantially parallel to a longitudinal axis of the intermediate section and a transverse component transverse to the longitudinally extending component. In some embodiments, the grasping end includes a handle having an open loop configuration.

In some embodiments, the vibrational device is composed of a single piece of metal.

In some embodiments, the insertion end has a length and thickness of sufficient size so when inserted into the ground, the vibrational device is self-standing.

BRIEF DESCRIPTION OF THE DRAWINGS

So that those having ordinary skill in the art to which the subject invention appertains will more readily understand how to make and use the system and apparatus (device) disclosed herein, preferred embodiments thereof will be described in detail hereinbelow with reference to the drawings, wherein:

FIG. 2A is a front view of the device of FIG. 1A;

FIG. 2B is a side view of the device of FIG. 1A;

FIG. 3 is a top view of the device of FIG. 1A;

FIG. 5 is a front view of the device of FIG. 4A;

FIG. 6 is a top view of the device of FIG. 4A;

FIG. 7 is a close-up view of the area of detail A of FIG. 5;

FIG. 8 is a close-up view of the area of detail B of FIG. 5;

DETAILED DESCRIPTION OF PREFERRED EMBODIMENTS

Figure 1A:
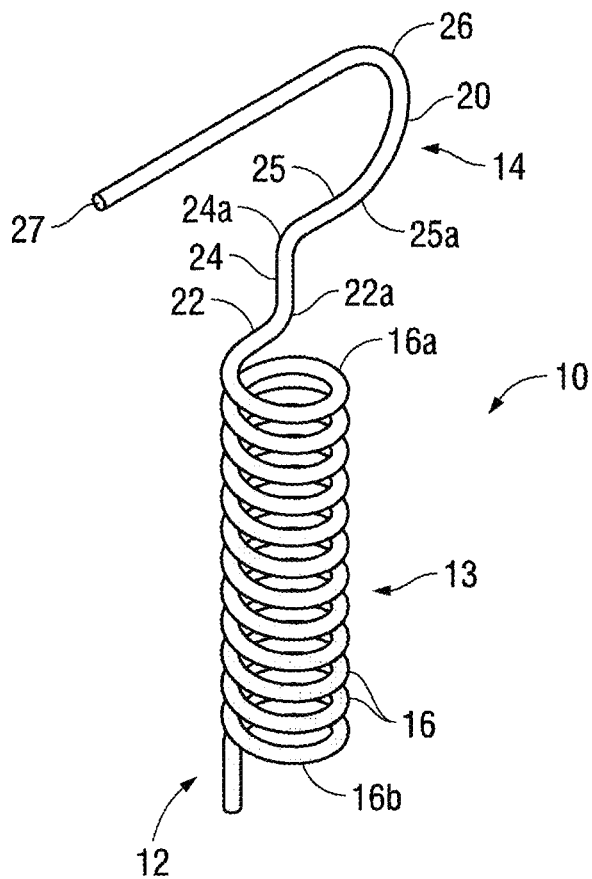
FIG. 1A is side perspective view of an embodiment of the worm attracting vibrational device of the present invention.
Figure 1B:
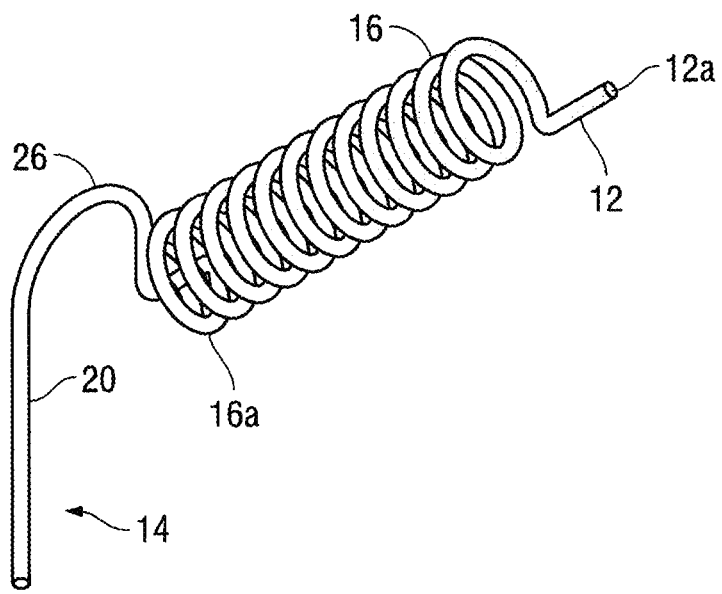
FIG. 1B is a perspective view of the worm attracting device of FIG. 1A in a different orientation.
Figure 4A:
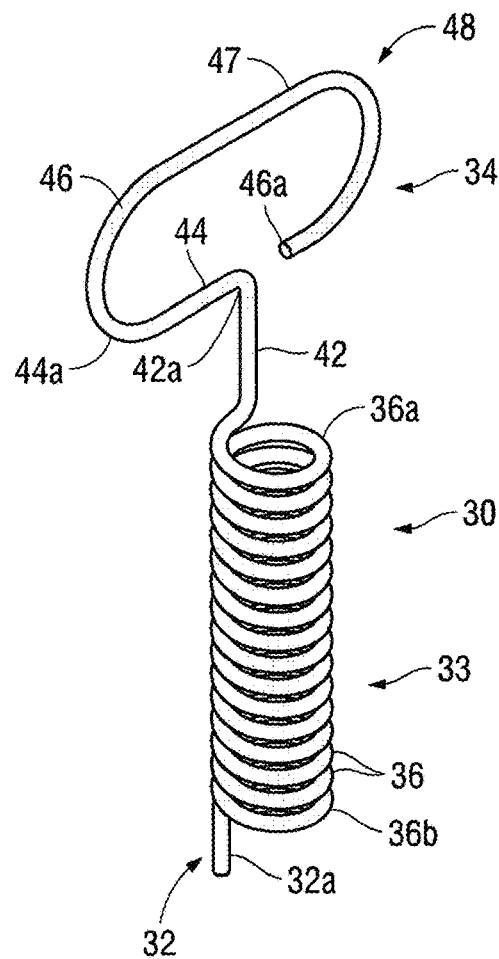
FIG. 4A is a perspective view of an alternate embodiment of the worm attracting vibrational device of the present invention.
Figure 4B:
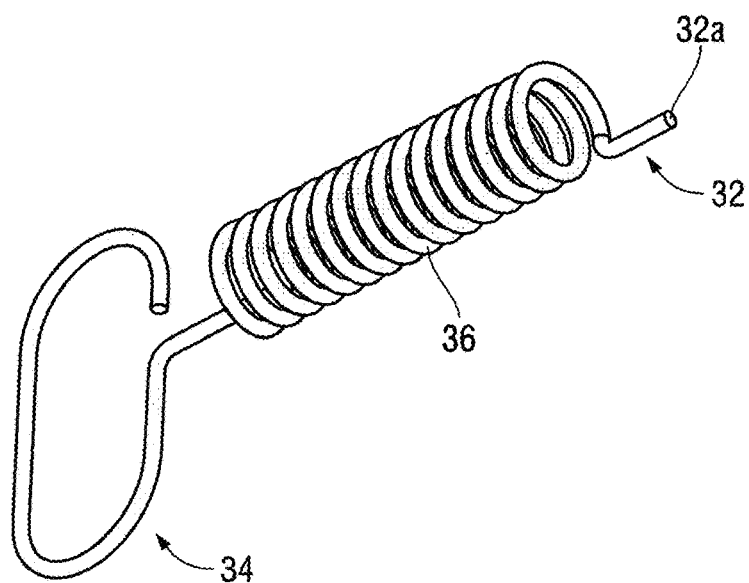
FIG. 4B is a perspective view of the device of FIG. 4A in a different orientation.
Figure 9:
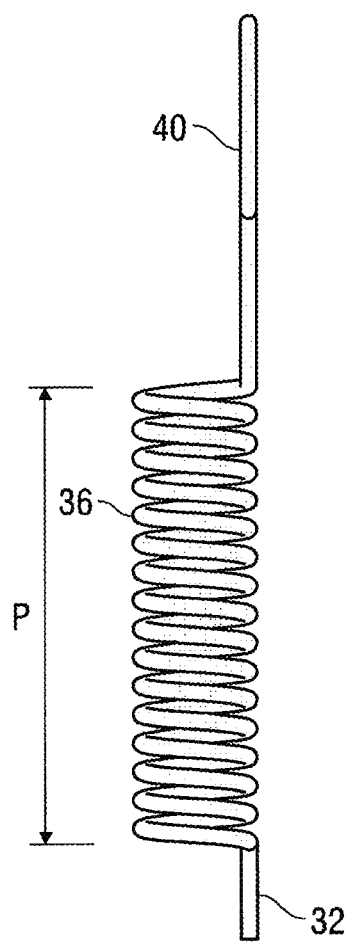
FIG. 9 is a side view of the device of FIG. 4A.

The present invention is directed to a system utilizing vibration to attract worms to the surface of the soil. The system includes a) a device insertable into the ground having a series of coils; and b) a strummer to move along the coils to create the desired vibration. Various coil positioning is disclosed with the coils configured to best accommodate the strummer and best cause vibration (at desired frequencies) to drive worms to the surface.

The system can be used to attract worms for various applications such as for fishing, providing food for pets, for placement in gardens such as vegetable gardens to help enrich the soil, as well as other uses. The system/device is cost effective and easy to use and specifically designed to provide a desired vibration for worm attraction.

Referring now to the drawings and particular embodiments of the present invention, wherein like reference numerals identify similar structural features or methods of the systems throughout the several views, FIGS. 1A to 3 illustrate one embodiment of the worm attracting device of the present invention and FIGS. 4A-9 illustrate an alternative embodiment of the worm attracting device of the present invention.

Note the term "upper" as used herein denotes the region, e.g., coil, closer to the user (further from the ground) once the device is inserted into the ground and the term "lower" as used herein denotes the region, e.g., coil, closer to the ground once inserted. Note further the term "proximal" as used herein denotes the portion of the device closer to the user (further from the ground) once the device is inserted into the ground and the term "distal" as used herein denotes the portion of the device closer to the ground once inserted. Thus, the handle held by the user would be at the upper or proximal end of the device and the insertion end would be at the lower or distal end of the device.

With initial reference to FIG. 1A, the vibration device is designated generally by reference numeral 10, and includes a ground insertion end 12, a handle end 14 at the opposing end and an intermediate or coiled section 13, containing a plurality of coils 16, intermediate the ends 12 and 14. The ground insertion end 12 extends distally from the lowermost coil 16b and is preferably substantially parallel to a longitudinal axis of the intermediate section 13. In some embodiments, the insertion end 12 is aligned with a central longitudinal axis of the intermediate section 13; in other embodiments, such as in the illustrated embodiment, it is offset from the central longitudinal axis of intermediate section 13. It can be slightly offset or offset so as to be aligned with an end, i.e., the outer edge of the coils, (see axis E1 of FIG. 2B).

The insertion end 12 preferably has a blunt tip 12a, but alternatively can include a pointed or spike end. The insertion end 12 is configured to be inserted into the ground, e.g. soil. The length of the ground insertion end 12, as well as the tip 12a, can vary. In some embodiments, they are of sufficient length e.g., about one inch in the illustrated embodiment, so they are inserted into the ground to a degree wherein the device 10 is self-standing so it need not be held by the user during use. In other embodiments, the device 10 is not self-standing and would need to be held, e.g., held upright or substantially vertically, by the hand of the user during use.

Figure 10:
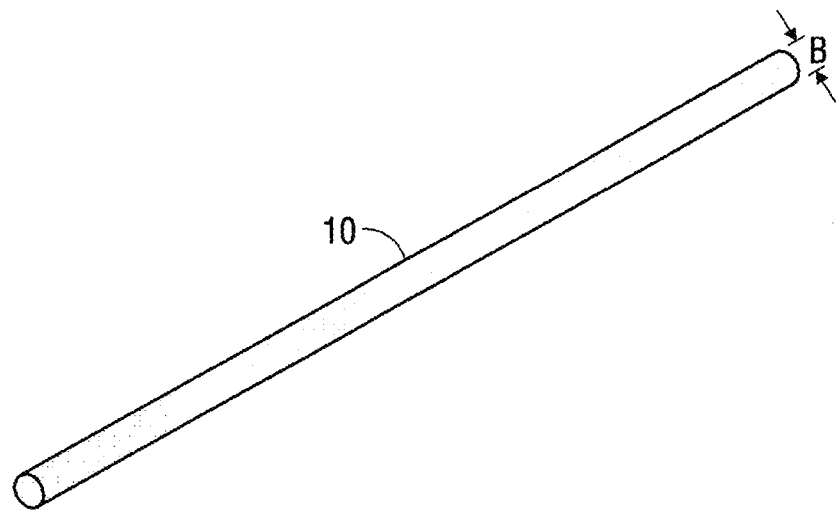
FIG. 10 is a perspective view of the strummer which can be used with the devices of FIGS. 1-8.

In the embodiment of FIGS. 1A-3, the coiled intermediate section 13 contains 12 coils. It should be appreciated that a different number of coils could be provided. Furthermore, the pitch of the coils can vary from that shown. The pitch is selected to achieve the desired vibration and in some embodiments is selected to provide a spacing to prevent the strummer from getting stuck between the coils 16 such as if the strummer is positioned in a direction perpendicular to a longitudinal axis of the intermediate section 13. In other words, the space, i.e. distance A between adjacent coils (only one of which is labeled for clarity) in preferred embodiments is less than the outer diameter B of the strummer (FIG. 10). For example, in the embodiment of FIGS. 1A and 10, the strummer 30 can have a diameter B, e.g., of about 0.88 inches, in which case the distance A between coils can be less than B, e.g., <0.88 inches. Other dimensions for "A" and "B" are also contemplated.

Also as shown in the drawings, the length L (FIG. 2B) of the intermediate section 13 (extending from uppermost coil 16a to lowermost coil 16b) can be about 4.81 inches, although other dimensions are also contemplated. The outer diameter C of the coil in the illustrated embodiment can be about 1.42 inches and the inner diameter can be about 1.01 to about 1.07 inches. It should be appreciated that these dimensions of the device 10, and other dimensions depicted in the drawings and described herein, provide one example of device sizes/measurements, as devices having other dimensions/sizes/measurements are also envisioned and within the scope of the present invention.

Device 10 at handle end 14 includes a handle 20 extending from the uppermost coil 16a. Handle 20 extends axially/vertically, i.e., substantially perpendicular to the central longitudinal axis M of intermediate section 13, at region 22, then transitions at a slight curve/radius 22a to extend substantially parallel to the longitudinal axis at region 24, then transitions at radiused region 24a to extend transverse with respect to the longitudinal axis M at region 25, extending in a first direction away from the longitudinal axis M and then transitions at another slight curve/radius 25a to continue into a J-shaped region 26, curving back toward the longitudinal axis M and extending past the longitudinal axis of the intermediate region 13, terminating at blunt end 27. Thus, the top portion 28 extends beyond axis E1, E2 defined by the opposing edges of the coils 16a.

Note in preferred embodiments, the device is made from a single piece of metal which can be cut, g., laser cut, to the desired configuration. In alternate embodiments, the device can be made of separate components attached together, e.g., the handle can be attached to the coiled section 13. The device 10 can be formed of a metal component, such as a metal wire, circular in cross section and having a uniform diameter throughout. In alternative embodiments, the diameter of the component can vary along its length, e.g., vary at different sections/regions. In alternative embodiments, the component/wire cross-section can be non-circular.

FIGS. 5-9 illustrate an alternate embodiment of the vibration device of the present invention. The vibration device, designated generally by reference numeral 30, includes a ground insertion end 32, a handle end 34 at the opposing end and an intermediate or coiled section 33, containing a plurality of coils 36, intermediate the ends 32 and 34. The ground insertion end 32 extends from the lowermost coil 36b and is preferably substantially parallel with the longitudinal axis N of the intermediate section 33. In some embodiments, the insertion end 12 is substantially aligned with the central longitudinal axis of the intermediate section; in other embodiments, such as in the illustrated embodiment, it is offset from the central longitudinal axis. It can be slightly offset or offset so as to be aligned with an end, i.e., the outer edge of the coils (see axis E3 of FIG. 9).

The insertion end 32 is preferably blunt but of sufficient thickness and stability that, like insertion end 22 of device 10, it is readily insertable into the ground by a user's hand without requiring a tool. Alternatively, it can include a pointed or spike end at the tip 32a which is configured to be inserted into the ground. The length of the ground insertion end 32, in the illustrated embodiment, like illustrated insertion end 12, is about 1 inch, although other lengths are also contemplated. As in device 10, in some embodiments, the insertion end 32 is of sufficient length so it is inserted into the ground to a degree wherein the device 30 is self-standing so it need not be held by the user during use. In other embodiments, the device 30 is not self-standing and would need to be held, e.g., held upright or substantially vertically, by the hand of the user during use.

Like device 10, device 30 has a plurality of coils 36. The coils can be the same in number, size and pitch as coils 16 of FIGS. 1A-3. In the embodiment of FIG. 4-9, the coil configuration differs from the coil configuration of FIGS. 1-3. Intermediate section 33 of device 30 contains 16 coils. It should be appreciated that a different number of coils could be provided. Furthermore, the pitch of the coils 36 is smaller than the pitch of coils 16, i.e., the coiled section is more tightly wound and is therefore stiffer. This provides even less spacing (gap) F for the strummer to get stuck in the coils during use as the distance F between adjacent coils (only one of which is labeled for clarity) is less than the diameter B of the strummer as explained above to close the gap even further than in device 10. The devices of the present invention achieve the balance between sufficient number of coils and sufficient spacing of the coils to effect a desired frequency range without interfering or restricting movement of the strummer. Note that alternative spacing between coils is also contemplated.

Also as shown in the drawings, the length P of the intermediate section 32 (extending from uppermost coil 36*a* to lowermost coil 36*b*) can be about 5 inches, although other dimensions are also contemplated. This length in this embodiment is greater than that of FIG. 2A because of the additional coils, although not proportionally longer due to the tighter spacing between coils. The outer diameter G1 of the coil in the illustrated embodiment can be about 1.38 inches and the inner diameter G2 can be about 0.97 to about 1.03 inches (FIG. 6). The diameter H of the metal component which forms the coils 36, can be about 0.188 inches. It should be appreciated that these dimensions of the device 30 (as well as of device 10 described above), and other dimensions depicted in the drawings, provide one example of device measurements/sizes as devices having other dimensions/measurements/sizes are also envisioned and within the scope of the present invention.

Device 30 includes a handle region 34 having a handle 40 extending upwardly from the uppermost coil 36*a*. Handle 40 extends axially/vertically, i.e., substantially parallel to the longitudinal axis N of intermediate section 33, at region 42, then transitions at a slight curve/radius region 42*a* (see detail of FIG. 7) to extend transversely at region 44 away from the longitudinal axis N of the intermediate section 33 in a first direction and then transitions at another slight curve/radius at region 44*a* and then transitions at curve/radius region 46 into a J-shape, forming a loop shaped region 48 (with a transversely extending linear region 47). The looped region 48 extends less than 360 degrees, forming an open oval-like shape, with end 46*a* extending toward the longitudinal axis N of the intermediate section 43. The blunt end 46*a* is spaced a distance from the transition 42*a* providing an access opening for attachment of a label. The loop 46 can also help orient the device 30 during packaging of the device 30 in manufacture. Such opening/space is also provided in handle 20. In some embodiments, the axial section 42 can be aligned with insertion end 32. In other embodiments, they are radially offset.

Note in preferred embodiments, the device 30, like device 10, is made from a single piece of metal, such as a metal wire, which can be cut, g., laser cut, to the desired configuration. In alternate embodiments, the device can be made of separate components attached together, e.g. the handle 40 can be attached to the coiled section 33. The device 40 can be formed of metal component circular in cross section (or alternatively of non-circular cross-sectional configuration) and having a uniform diameter throughout. In alternative embodiments, the diameter of the component can vary along its length, e.g., vary at different sections/regions.

The devices 10 and 30 can be composed of cold drawn spring wire made of steel with a zinc coating, although other metal materials and coatings are also contemplated.

The strummer 50, shown in FIG. 10, is in the form of a metal rod or wire that is moved up and down along the coils 16 or 36 to create a vibration. In some embodiments, the strummer 50 can be formed from the same material as the device 10 or 30, and can be formed by cutting a desired length of the metal component during forming of the device 10 or 30. In some embodiments, the strummer 50 has a length of about 7 inches, although other dimensions are also contemplated. For ease of manufacture, as noted above, the strummer 50 can be formed from the device 10 or 30, however, in alternate embodiments, the strummer can be formed from a separate component and can be made of different material and be dimensioned differently, in length, diameter and/or cross-section, than strummer 50 shown in FIG. 10. If the strummer is formed from the same component as the vibration device, its outer diameter can be larger than the spacing between the coils by decreasing a distance between coils. If the strummer is formed from a separate component or material, it can be manufactured with a diameter larger than the spacing between the coils. A strummer having an outer diameter less than the spacing between the coils is also contemplated, although a diameter greater than the spacing is preferred.

In use, the device 10 (or device 30) is pushed into the ground so its insertion end 12 (or 32) is inserted into the ground such as into rich soil, a compost pile, or ground in the woods. The handle 20 (or 40) is held with one hand by the user, and the strummer 60 is held in the other hand and the user strums the coils to create vibrations as it is moved up and down along the oils causing vibration to attract worms/bring worms to the surface.

The present invention advantageously provides a large vibration in a small package.

While the present invention has been described with reference to the specific embodiments thereof it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the present invention. All such modifications are intended to be within the scope of the claims appended hereto.

Where a range of values is provided, it is understood that each intervening value, between the upper and lower limit of that range is encompassed within the invention.

Although the apparatus and methods of the subject invention have been described with respect to preferred embodiments, which constitute non-limiting examples, those skilled in the art will readily appreciate that changes and modifications may be made thereto without departing from the spirit and scope of the present invention as defined by the appended claims.

It will be understood by those skilled in the art that the above particular embodiments are shown and described by way of illustration only. The principles and the features of the present disclosure may be employed in various and numerous embodiments thereof without departing from the scope and spirit of the disclosure as claimed. The above-described embodiments do not restrict the scope of the disclosure.

Additionally, persons skilled in the art will understand that the elements and features shown or described in connection with one embodiment may be combined with those of another embodiment without departing from the scope of the present invention.

Throughout the present disclosure, terms such as "approximately," "about," "generally," "substantially," and the like should be understood to allow for variations in any numerical range or concept with which they are associated.

For example, it is intended that the use of terms such as "approximately," "about" and "generally" should be understood to encompass variations on the order of 25%, or to allow for manufacturing tolerances and/or deviations in design.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vibrational system for attracting worms comprising; a vibrational device comprising:
   a) a ground insertion end at a distal portion;
   b) a grasping end at a proximal portion; and
   c) a plurality of coils at an intermediate portion between and connecting the distal portion and the proximal portion, the plurality of coils spaced apart axially along a longitudinal axis of the device to provide axially spaced apart gaps between the plurality of coils along the longitudinal axis configured to emit a vibration that attracts worms upon strumming of the coils.

2. The system of claim 1, where the ground insertion end extends distally from a lowermost coil and is substantially parallel to a longitudinal axis of the intermediate portion.

3. The system of claim 1, wherein the insertion end is aligned with a central longitudinal axis of the intermediate section.

4. The system of claim 1, wherein the insertion end is offset from a central longitudinal axis of the intermediate section and aligned with an outer edge of the plurality of coils.

5. The system of claim 1, wherein the insertion end has a blunt tip.

6. The system of claim 1, wherein the insertion end has a pointed tip.

7. The system of claim 1, wherein the vibrational device is self-standing when the insertion end is inserted into a ground.

8. The system of claim 1, wherein the grasping end includes a handle having a longitudinally extending component substantially parallel to a longitudinal axis of the intermediate section and a transverse component transverse to the longitudinally extending component.

9. The system of claim 1, wherein the grasping end includes a handle having an open loop configuration.

10. The system of claim 1, wherein the vibrational device is composed of a single piece of metal.

11. The system of claim 1, wherein the insertion end has a length and thickness of sufficient size so when inserted into the ground, the vibrational device is self-standing.

12. The system of claim 1, further comprising a strummer for strumming the coils, the strummer being a separate component from the vibrational device.

13. The system of claim 12, where a space between adjacent coils of the plurality of coils is less than an outer diameter of the strummer to thereby prevent the strummer from getting stuck between adjacent coils.

14. A vibrational system for attracting worms comprising:
   a) a vibrational device comprising:
      i) a ground insertion end at a distal portion;
      ii) a grasping end at a proximal portion; and
      iii) a plurality of coils at an intermediate portion between and connecting the distal portion and the proximal portion, the plurality of coils configured to emit a vibration upon strumming of the coils;
   b) a strummer configured for strumming the coils, the strummer being a separate component unattached to the vibrational device and engageable with any one of the plurality of coils.

15. The system of claim 14, where a space between adjacent coils of the plurality of coils is less than an outer diameter of the strummer to thereby prevent the strummer from getting stuck between adjacent coils.

16. The system of claim 14, wherein the strummer includes an elongated metal rod.

17. The system of claim 14, wherein the grasping end includes a handle having a component extending parallel to a longitudinal axis of the intermediate portion and substantially aligned with the insertion end.

18. The system of claim 14, wherein the insertion end has a length and thickness of sufficient size so when inserted into the ground, the vibrational device is self-standing.

19. The system of claim 14, wherein the insertion end is offset from a central longitudinal axis of the intermediate section and aligned with an outer edge of the plurality of coils.

20. The system of claim 14, wherein the grasping end includes a handle having a longitudinally extending component substantially parallel to a longitudinal axis of the intermediate section and a transverse component transverse to the longitudinally extending component.

* * * * *